United States Patent [19]

Terry

[11] Patent Number: 5,119,370
[45] Date of Patent: Jun. 2, 1992

[54] SWITCHING NODE FOR A COMMUNICATIONS SWITCHING NETWORK

[75] Inventor: John B. Terry, Carp, Canada

[73] Assignee: Northern Telecom Limited, Montreal, Canada

[21] Appl. No.: 413,667

[22] Filed: Sep. 28, 1989

[51] Int. Cl.⁵ .................... H04Q 11/04; H04J 3/12
[52] U.S. Cl. .................... 370/60.1; 370/110.1
[58] Field of Search ........... 370/60, 60.1, 94.1, 370/94.2, 94.3, 58.1, 58.2, 58.3, 110.1, 54

[56] References Cited

U.S. PATENT DOCUMENTS 4,821,259  4/1989  DeBruler et al. .................... 370/60

OTHER PUBLICATIONS

"Burst Switching—An Introduction" by Stanford R. Amstutz, IEEE Communications Magazine, Nov. 1983, pp. 36 to 42.
"Asynchronous Time Division Techniques: An Experimental Packet Network Integrating Video Communication" by A. Thomas, M. Servel, and J. P. Coudreuse, ISS, May 1984.
"Integrated Wideband Networks Using Asynchronous Time Division Techniques" by H. Le Bris and M. Servel, IEEE International Conference on Communications, 1986.
"Preclude: An Asynchronous Time-Division Switched Network" by J. P. Coudreuse and M. Servel, IEEE International Conference on Communications, 1987.

Primary Examiner—Douglas W. Olms
Assistant Examiner—Wellington Chin
Attorney, Agent, or Firm—R. John Haley

[57] ABSTRACT

A switching node for an optical communications switched network includes a circuit switch for making relatively long duration circuit-switched connections and an ATM message switch, which is coupled in the network via the circuit switch, for communicating relatively short duration messages or datagrams. The messages include signalling messages for establishing the circuit-switched connections, the ATM switch being coupled to control circuitry of the circuit switch for communication of such messages. The control circuitry includes free channel queues which enable the communication of signalling messages throughout a network to be effected rapidly without delays due to the time division multiplex frames in accordance with which the circuit switch is operated. In a preferred form, the control circuitry is constituted by a micro-controller and random access memory.

14 Claims, 4 Drawing Sheets

SWITCHING NODE FOR A COMMUNICATIONS SWITCHING NETWORK

This invention relates to a switching node for a communications network, and is particularly concerned with a switching node which can be used to facilitate the communication of various types of information having widely varying bandwidths and connection set-up and duration requirements.

In a communications network, it is well known to provide different types of switching nodes for different types of information. For example, packet switches are used for switching relatively short-duration data packets in a packet-switched communications network, and circuit switches are used for switching relatively long-duration information, such as voice or motion video communications, in a circuit-switched communications network. Communications networks are evolving as synchronous optical networks, in which information is communicated via optical fiber communications paths between synchronous switching nodes. ATM (asynchronous time-division multiplex) switches constitute a currently preferred form of packet or message switch, which can operate conveniently in a synchronous optical network.

Message switches such as packet and ATM switches are particularly well suited to handling reliably large numbers of relatively short information messages, such as for example control information and financial transactions, typically comprising up to about $10^3$ bytes per message. Thus the use of ATM switches is desirable for this type of information in a synchronous optical network. However, such switches are not well suited to handling much wider bandwidth and longer duration massages. such as voice communications (telephone calls) which may typically comprise $10^7$ bytes per call or message, and motion video communications which may comprise of the order of $10^{10}$ bytes per message. Conversely, circuit switches, which are well suited for handling voice and video communications of relatively long duration, are not well suited to handling large numbers of short messages due to their relatively long connection set-up and release times, which may be orders of magnitude greater than the duration of such short messages.

Especially with increasing numbers of LANs (local area networks) and communications of data and software between them, and the provision of other communications services such as facsimile and graphics transmission, there is an increasing need for spontaneous communications of information messages of the order of $10^4$ to $10^6$ bytes. For example, an operator at a data terminal may issue a command to call up from a remote location a graphics screen comprising of the order of $10^5$ bytes; to respond to such a command without an undue delay requires communication of the graphics screen information using a relatively wide bandwidth connection which is rapidly set up. Circuit switches do not readily satisfy the rapid connection set-up requirement, and increasing the capacity of an ATM switch to handle such messages present problems relating to cell loss in ATM switches. In particular, the bursty characteristics of such information in ATM switch nodes may cause loss of short messages in the nodes even if these are designed with a greatly increased capacity, and such losses may cause a substantially complete disruption of communications via the network.

Accordingly, an object of this invention is to provide an improved switching node for a communications network for facilitating the handling of these various types of message.

According to one aspect of this invention there is provided a switching node comprising: circuit witching means for establishing circuit-switched connection paths between inputs and outputs of the switching node; message switching means for communicating messages via the switching node; and control means for controlling the circuit switching means to establish said circuit-switched connection paths in dependence upon connection signalling messages communicated via the message switching means.

Thus in accordance with this invention short message traffic and connection signalling messages for other, longer duration and higher capacity traffic, can be handled by a message switch of relatively low capacity and rapid response, while the longer duration and higher capacity traffic is handled by a circuit switch controlled by the signalling messages conducted via the message switch.

Preferably the control means comprises means for receiving a connection signalling message from the message switching means; means responsive to a received connection signalling message for establishing a connection via the circuit switching means; and means for supplying to the message switching means a connection signalling message dependent upon the received connection signalling message and the establishment of a connection via the circuit switching means.

It is especially desirable, for achieving rapid propagation of connection signalling messages through network and rapid circuit-switched connections, if the control means further comprises means for maintaining at least one queue identifying free connection paths at the outputs of the switching node, and the means for establishing a connection and the means for supplying a connection signalling message are each responsive to an identification of a free connection path from said queue in response to a received connection signalling message for establishing a connection via the circuit switching means.

Conveniently the message switching means comprises an ATM (asynchronous transfer mode, or asynchronous time division multiplex) switch, which preferably is coupled to the circuit switching means for conducting the connection signalling messages to and from the message switching means via the circuit switching means.

According to another aspect this invention provides a switching node for establishing message-switched and circuit-switched communications in a switching network, the switching node comprising: a circuit switch for establishing switched connections between inputs and outputs of the switching node, the circuit switch including control means; and an ATM message switch for establishing message-switched communications via the switching node, the ATM message switch being arranged for supplying to and receiving from the control means of the circuit switch signalling messages for controlling the establishment of said switched connections.

The invention will be further understood from the following description with reference to the accompanying drawings, in which.

Throughout the drawings, similar references are used in the different figures to denote similar parts.

Figure 1:
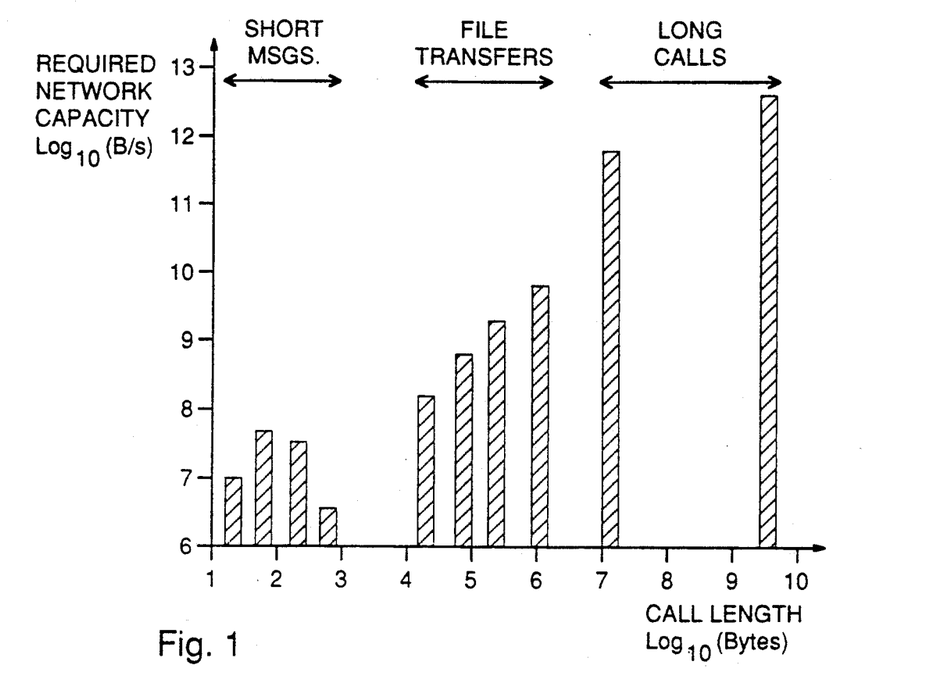
FIG. 1 is a chart representing characteristics of traffic in a communications network.

Referring to FIG. 1, there is illustrated a chart showing, for various types of traffic, representative average busy-hour capacities which could be required of a communications network carrying the traffic. The horizontal scale is a logarithmic scale representing the duration or length of a typical call in bytes for the respective type of traffic, and the vertical scale is a logarithmic scale of total traffic capacity in bytes/second for the respective type of traffic.

In order of increasing typical call length, i.e. from left to right in FIG. 1, the columns of FIG. 1 represent the following traffic types. In the following lest and in FIG. 1, these traffic types are also classified into three categories, namely short messages, file transfers, and long calls:

| | |
|---|---|
| Acknowledgements<br>Call Control Messages<br>Financial Transactions<br>OA&M Messages | Short Messages |
| Software Transfer<br>Facsimile Transmission<br>Graphics Transmission<br>Still Video Transmission | File Transfer |
| Voice Calls<br>Video Transmission | Long Calls |

It should be noted that the short messages and file transfers are typically spontaneous types of traffic, in that it is desirable that they be communicated without significant connection set-up delays. In contrast, the long call traffic can tolerate connection set-up delays such as are present in existing voice call circuit switches.

As can be seen from FIG. 1, short messages have typical call lengths of less than $10^3$ bytes, file transfers have typical call lengths of $10^4$ to $10^6$ bytes, and long calls have typical call lengths of $10^7$ to $10^{10}$ bytes. By far the greatest network capacity is required for long calls, comprising telephone voice calls and video, e.g. television, transmission, for which circuit-switched connections are typically used in existing communications networks. On the contrary, short messages, which are typically handled using existing packet-switched communications, impose a relatively small requirement on network capacity. As already discussed, file transfers require a significant bandwidth or network capacity and also, like the short messages, require short connection set-up times in view of their spontaneous nature.

It has been considered as being desirable to handle all types of traffic using a communications network with a single type of switching node. In this respect, ATM (asynchronous transfer mode) switches operating within a SONET (synchronous optical network) optical communications network have been identified as a possible form of such a network. However, the disparate traffic characteristics as illustrated in FIG. 1 for the different categories of traffic indicate that a different type of switching node may be preferable.

More particularly, the short message traffic in FIG. 1 is well suited to being handled by ATM switching nodes, whereas the long call traffic of FIG. 1 is better suited to being handled by STM (synchronous time-division multiplex) switching nodes. Attempting to handle long call traffic in ATM switching nodes leads to greatly increased complexity for establishing semi-permanent virtual connections through the nodes, and long call connection overhead and set-up times in STM switching nodes made these undesirable for handling the short message traffic. The intermediate, file transfer, traffic can be handled by either type of switching node with commensurate advantages and disadvantages.

Figure 2:
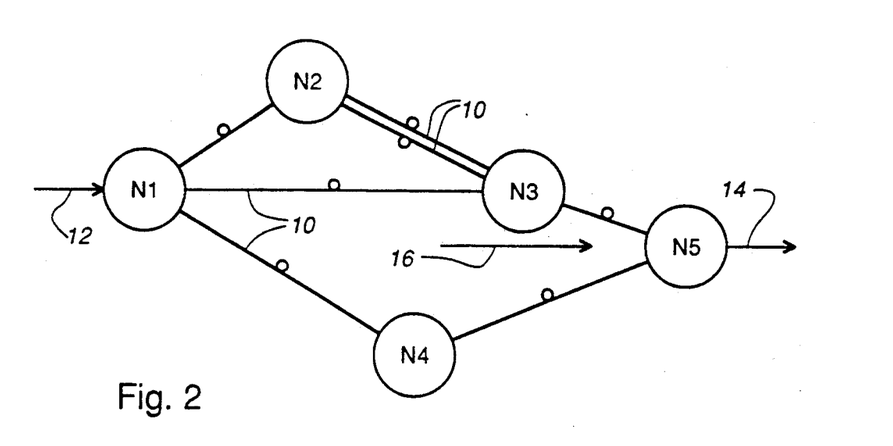
FIG. 2 schematically illustrates a communications network including a plurality of switching nodes.
Figure 3:
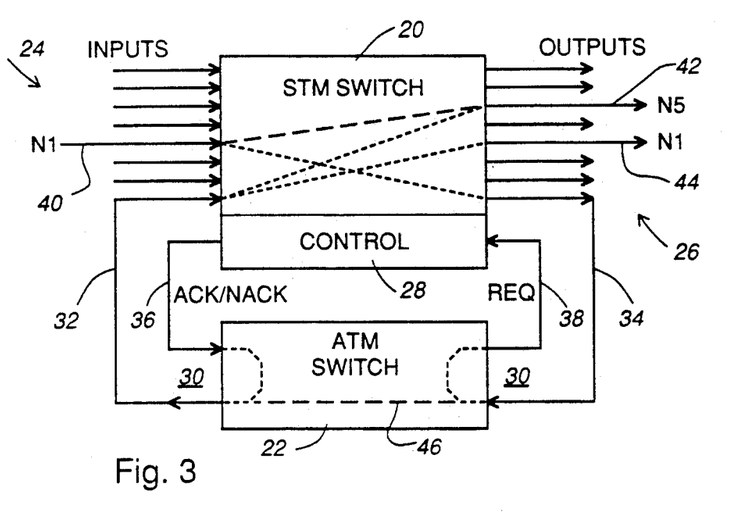
FIG. 3 schematically illustrates a switching node in accordance with an embodiment of this invention.

FIG. 3 illustrates a different type of switching node in accordance with this invention, which may be used in a communications network as illustrated in FIG. 2.

Referring to FIG. 2, five switching nodes N1 to N5, each of which can be of the form described below, are illustrated interconnected by optical communications fibers 10. Only a few fibers 10 are shown in FIG. 2 for simplicity, and many more may be provided to accommodate traffic requirements and opposite directions of transmission. In particular, different numbers of fibers 10 may be provided between different nodes according to traffic requirements; for example two fibers 10 are shown between the nodes N2 and N3 for carrying more traffic than can be accommodated on one fiber. Traffic on each fiber 10 is time division multiplexed in conventional manner.

In the communications network of FIG. 2, traffic of arbitrary type can be communicated between arbitrary nodes. For example, FIG. 2 represents by arrows 12 and 14 traffic incoming at the node N1 and outgoing at the node N5; such traffic may for example be routed through the network between the nodes N1 and N5 via the node N3 as shown by an arrow 16. By way of example, this traffic is assumed here to comprise a signalling header followed by a data message of arbitrary duration. As discussed in greater detail below, the signalling header includes a network address of the destination for the traffic, from which the switching nodes N1, N3, etc. determine an appropriate routing for the traffic through the network, and may include other information such as information concerning the nature of the message (e.g. voice call, acknowledgement, etc.) and a check sum for avoiding errors. Traffic of this general type is known for example from an article entitled "Burst Switching—An Introduction" by Stanford R. Amstutz, IEEE Communications Magazine, Nov. 1983, pp. 36 to 42.

Referring now to FIG. 3, there is illustrated a form of switching node in accordance with an embodiment of this invention. The switching node comprises an STM switch 20 and an ATM switch 22 which are associated with one another as described in detail below. The STM switch 20 can comprise a conventional cross-point matrix or time switch for establishing circuit-switched connections between inputs 24 and outputs 26 under the control of a control part 28 of the switch. The ATM switch 22 serves for establishing message-switched connections (virtual circuits) or datagrams between its inputs and outputs 30, and also can comprise a known form of switch. Examples of the form of ATM switches are known for example from the following articles:

"Asynchronous Time Division Techniques: an experimental packet network integrating video communication" by A. Thomas, M. Servel, and J. P. Coudreuse, ISS, May 1984;

"Integrated Wideband Networks Using Asynchronous Time Division Techniques" by H. Le Bris and M. Servel, IEEE International Conference on Communications, 1986; and "Prelude: an Asynchronous Time-Division Switched Network" by J. P. Coudreuse and M. Servel, IEEE International Conference on Communications, 1987.

Inputs 24 of the STM switch 20 are coupled in known manner to the fibers 10 (FIG. 2) incoming from other switching nodes, and outputs 26 of the STM switch 20 are coupled in known manner to the fiber 10 (FIG. 2) outgoing to other switching nodes. Links 32, 34, 36, and 38 are provided between the STM switch 20 and the ATM switch 22 for the communication of information therebetween, as described further below.

Assuming for example that FIG. 3 represents the switching node N3 of FIG. 2, then as illustrated in FIG. 3 an input 40 of the STM switch 20 may be coupled to the node N1 and outputs 42 and 44 of the STM switch 20 may be coupled to the nodes N5 and N1 respectively. The traffic represented by the arrow 16 in FIG. 2 is routed through the switching node N3 of FIG. 3, as shown by a long-dashed line through the STM switch 20, in the manner described below.

As already mentioned above, the traffic incoming from the node N1 on the line 40 comprises a signalling header and a subsequent message (e.g. file transfer or long call traffic) of arbitrary duration. More specifically, the signalling header is conveniently provided on a pre-allocated signalling tdm channel on the line 40, in the manner of common channel signalling, and the subsequent message is provided on another tdm channel on the line 40. Thus on the tdm line 40 there can conveniently be one tdm channel pre-allocated for carrying the signalling information for all of the other tdm channels on this line. The STM switch 20 is set up (e.g. in known manner by a management system of the network, not shown) to couple this signalling channel information to the link 34 and thence to an input of the ATM switch 22, as shown by a short-dashed line in FIG. 3. Similarly, signalling information on tdm channels at the other inputs 24 is coupled to the ATM switch 22 via preset connection paths through the STM switch 20 and via the link 34.

In a corresponding manner, signalling information produced by the ATM switch 22 on the link 32 is coupled by preset connection paths through the STM switch 20 to signalling tdm channels on the lines connected to the outputs 26 of the STM switch 20, as shown in FIG. 3 for example by short-dashed lines through this switch 20 to the outputs 42 and 44 for the nodes N5 and N1.

By means of these preset connection paths, the signalling information for file transfer and long call traffic connections, and likewise the short message traffic, can be routed to and from the ATM switch 22 in each switching node via the same fibers 10 which are used for coupling between the STM switches 20 in the switching nodes. This also provides the advantage that the preset connection paths can be modified by the network management system after initial set-up, to suit particular requirements or operating conditions. However, it should be appreciated that this arrangement is not essential, and that the signalling information and short message traffic could alternatively be coupled between ATM switches 22 in successive switching nodes by paths which are distinct and separate from the fibers 10 and which are not routed through the STM switches 20.

Accordingly, although as shown in FIG. 3 the links 32 and 34 extend between the switches 20 and 22, it should be appreciated that they may instead by provided extending directly from the ATM switch 22 to the ATM switches in other switching nodes without passing through the STM switch 20.

The signalling header and short message traffic which is coupled to and switched by the ATM switch 22 is in the form of so-called ATM cells, each of which has a standardized form which may comprise a 5-byte ATM header and a 48-byte ATM payload or message. The 5-byte ATM header contains an identity or address of an output of the ATM switch 22 to which the message is to be coupled; the switch 22 monitors this address and routes the message accordingly. In the ATM switch 22 of FIG. 3, the link 38 is allocated a respective ATM switch output address so that ATM cells which contain signalling information for setting up connections via the associated STM switch 20 are switched to it by the ATM switch 22. Such ATM cells are referred to below as connection path requests, and as represented by the label REQ in FIG. 3 are supplied to the control part 28 of the STM switch 20.

The control part 28 of the switch 20 also produces ATM cells on the link 36, which are switched through the ATM switch 22 in a similar manner to the link 32 to constitute either a positive acknowledgement (ACK) constituted by a signalling information ATM cell forwarded to the next node N5 or a negative acknowledgement (NACK) constituted by an ATM cell returned to the previous node N1, as further described below.

FIG. 3 illustrates by dashed lines in the ATM switch 22 the routes taken through this switch for connection path requests from the link 34 to the link 38 and positive and negative acknowledgements from the link 36 to the link 32. In addition, FIG. 3 illustrates by a dashed line 46 the coupling through the ATM switch 22 of short message traffic; as this is handled, in ATM cells as discussed above, in known manner it is not described further here. However, it should be appreciated that this short message traffic, together with the signalling information ATM cells described here, constitute a relatively low capacity load which can be readily handled by the ATM switch 22.

In the case of the signalling information ATM cells, each cell contains in its ATM payload information which is necessary or desirable for establishing and propagating a connection through the STM switches or negatively acknowledging requests for connections which can not be established. For example, in the case of a signalling information ATM cell incoming (e.g. from the node N1) to the ATM switch 20 (e.g. in the node N3) or forwarded as a positive acknowledgement to a subsequent node (e.g. the next node N5), the ATM payload of the cell can comprise such information as a call identifier, the calling number, the identity of the node, port, and channel originating the ATM cell, the destination network address, optional bandwidth requirements and service type designations, and a checksum. In the case of a negative acknowledgement, the ATM payload can comprise the call identifier, calling number, identity of the node producing the negative acknowledgement, originating port and channel numbers, and a checksum. These various types of information are given by way of example only, and not by way of limitation.

Thus the STM switch 20 is used to establish, under the control of signalling formation supplied via the ATM switch 22, circuit-switched paths through the switching node for traffic having a high capacity, for example the file transfer and long call categories in FIG. 1. The control or signaling information for such circuit-switched connections, and the short message category of traffic in FIG. 1, is routed through the switching node using the ATM switch 22. The particular division of traffic categories as discussed here is given by way of example and may be varied for particular circumstances. For example, some or all of the traffic in the file transfer category could be switched using the ATM switch 22 along, if this has a suitable capacity.

In view of the alternative configuration of the links 32 and 34 as discussed above, in the following description with reference to FIG. 4 the ATM switch 22 is shown as being connected only to the control part 28 of the STM switch 20 via the links 36 and 38 for the control of the circuit-switched connections.

Figure 4:
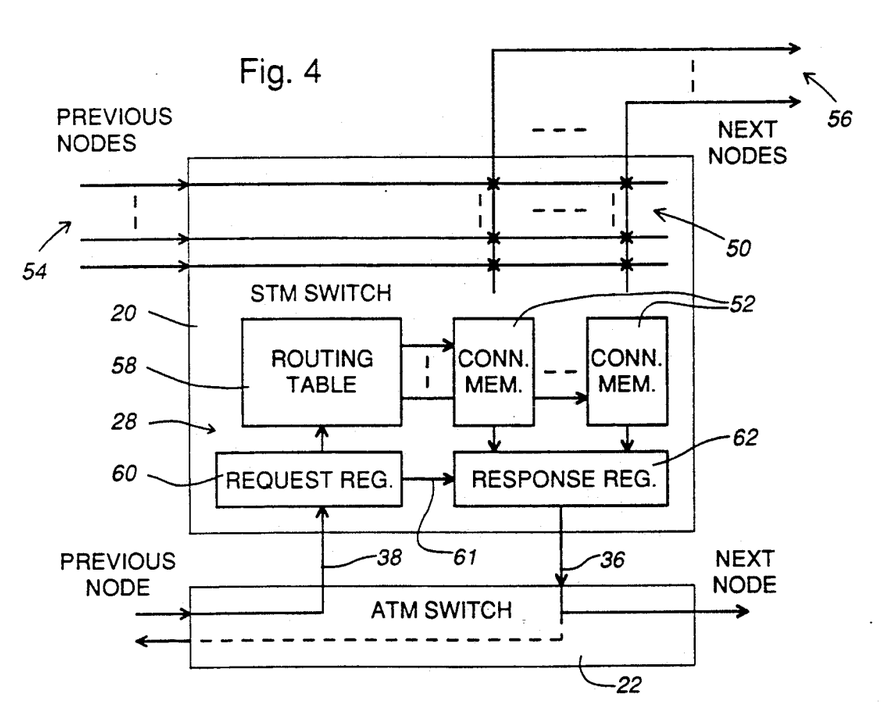
FIG. 4 illustrates in greater detail parts of one form of the switching node of FIG. 3.

Referring to FIG. 4, one form of the STM switch 20 and its control part 28 is shown in more detail. The switch comprises a matrix of cross-points 50, which are closed under the control of connection memories 52 to form in known manner connections between lines 54 incoming from previous nodes in the network and lines 56 outgoing to following or next nodes in the network. For convenience, FIG. 4 illustrates one connection memory 52 associated with each respective column of the cross-point matrix 50, and hence for each line 56. Each memory 52 is a cyclic memory containing information as to which cross-points are closed in each time slot of a tdm (time division multiplex) frame.

In order to establish connections via the STM switch 20, the control part 28 further includes a routing table 58, a connection path request register 60, and a connection response register 62. The routing table 58 contains stored information which identifies which lines 56 are coupled to which other nodes of the network. Each request for a connection through the STM switch 20 is supplied via the ATM switch 22 and link 38 as described above to the request register 60, and in accordance with the request and the information in the routing table 58 a respective one of the connection memories 52 is controlled to establish the desired connection through the cross-points which it controls. This connection is established for a particular output line 56 and in a particular time channel of the tdm frame; the identities of these are supplied from the respective connection memory 52 to the response register 62. As described in greater detail below, the response register 62 assembles a new ATM cell from this information supplied from the connection memory 58 and the original cell information which is supplied from the request register 60 via a line 61. The new ATM cell is supplied from the response register 62 to the link 36 and is switched depending on its ATM header, either as a forwarded signalling header to the next node or as a negative acknowledgement to the previous node.

More particularly, as described above the incoming ATM cell received in the request register 60 contains information identifying the incoming port (line 54) and channel of the associated message to be switched, and the destination network address. The destination network address is used to determine from the routing table which output line 56 is to be used for establishing the connection, thereby identifying a respective connection memory 52 for establishing the connection in known manner to the identified incoming port and channel. Assuming that a time channel is free so that a connection can be established, an identification of this time channel and the output line 56 (and hence of the next node in the network for this connection) are communicated to the response register 62. The register 62 is thus able to produce, from this information and the incoming ATM cell supplied via the line 61, an updated ATM cell with an ATM header for routing to this next node and establishing the connection therein. In this manner, the connection is established progressively through the appropriate switching nodes until the destination is reached.

In the event that, in any node, there is no free channel so that the connection can not be established in this node, this is communicated from the respective connection memory 52 to the response register 62, which accordingly produces the negative acknowledgement ATM cell which is routed to the previous or originating node via the ATM switch 22 to indicate the failure to establish the connection.

Whilst the switching node and network as so far described is operable, it has certain practical disadvantages. In particular, the registers 60 and 62 can accommodate only one connection request and response at a time, and this involves a delay of up to one tdm frame while the respective connection memory 52 determines whether or not there is a free channel available, in addition to the time required for processing the information. This delay would limit the number of connection requests which could be handled to a maximum of one per tdm frame, or 8000 per second in a typical network, which would not be sufficient in practice. Furthermore, this delay would necessitate some form of queuing of requests at the input to the request register 60. These disadvantages are substantially avoided by the modified arrangements described below.

Figure 5:
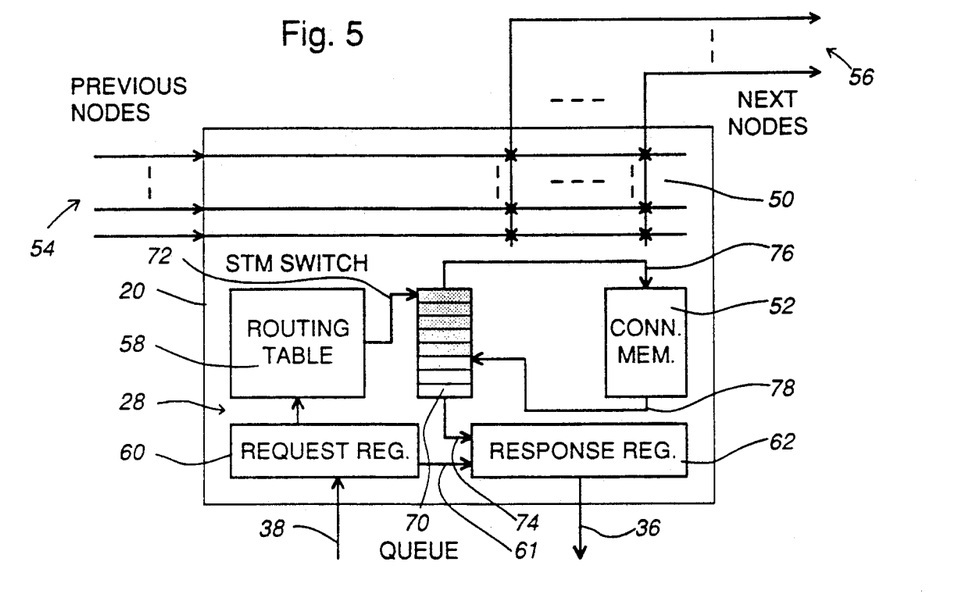
FIGS. 5 to 7 illustrate parts of alternative forms of the switching node.

FIG. 5 illustrates an alternative and improved form of part of the control part 28 of the STM switch 20. As shown in FIG. 5, a queue 70 of currently idle time slot channels for each respective one of the lines 56 is maintained for example in a register or RAM (random access memory), and hence for each connection memory 52, only one of which is shown in FIG. 5 for simplicity.

In response to a connection path request causing the routing table 58 to identify a particular line 56 and corresponding connection memory 52 for establishing a connection via the cross-point matrix 50, as indicated by a line 72 the identity of an idle channel is taken from the top of the queue and is supplied immediately (via a line 74) to the response register 62, and via a line 76 to the connection memory 52. The immediate response to the register 62 from the queue 70 rather than from the connection memory 52 as in FIG. 4 enables the register 62 immediately to produce the updated ATM cell, so that the call signalling information is propagated rapidly through the communications network, without incurring the above delay in the connection memory 52. Likewise, if no channel is free then the queue 70 is empty, so that this fact is immediately communicated to the response register 62 to provide an immediate negative acknowledgement.

As illustrated in FIG. 5 by a line 78, when a channel becomes free or idle at the end of a connection the connection memory 52 supplies its identity to the bottom of the queue 70. The detection of a channel becoming free can be conveniently achieved in known manner by flagging each busy channel and monitoring the presence of data on the flagged channels, resetting the flag and the connection memory 52 and updating the queue 70 when data is no longer present.

In addition to providing a much more rapid response to the register 62, whereby the above-described disadvantages are avoided, this arrangement has the advantage that the channel which is allocated for the connection is immediately removed from the queue, so that many connection requests can be handled independently of the tdm frame. Furthermore, the removal of free channels from the top of the queue and their return to the bottom ensures that all of the channels are used cyclically over time.

Consequently, it should be appreciated that this arrangement greatly facilitates the handling of the file transfer traffic described with reference to FIG. 1. By virtue of the rapid connection path set-up as described above, a connection for such traffic can be set up spontaneously without incurring conventional circuit-switched connection set-up delays. In addition, this connection is set up as a circuit-switched connection via the STM switch 20, which can readily accommodate the desired bandwidth for the file transfer traffic, so that the disadvantages of loading ATM switches with such traffic are avoided.

Figure 6:
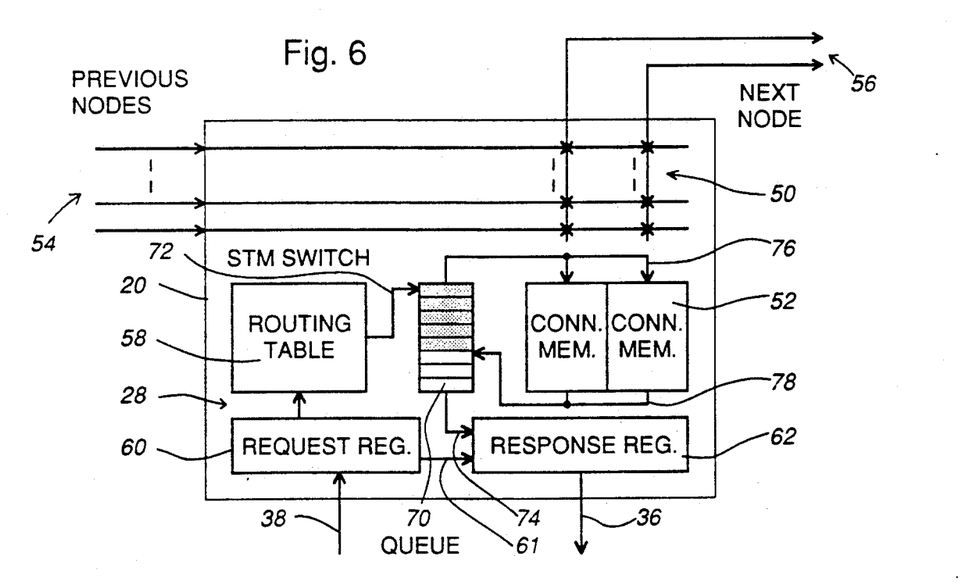

FIG. 6 illustrates a further modification for the case, such as between the nodes N2 and N3 is FIG. 2, where there are multiple lines 56 leading to a single next node, any of which lines may be used for a connection. As in FIG. 5, a queue 70 is maintained, but in FIG. 6 the queue identifies for each idle channel not only the identity of the channel but also the identity of the associated connection memory 52 or line 56. The sharing of a single queue 70 among multiple lines or facilities 56 provides an automatic selection and sharing or distribution of traffic among these facilities.

Figure 7:
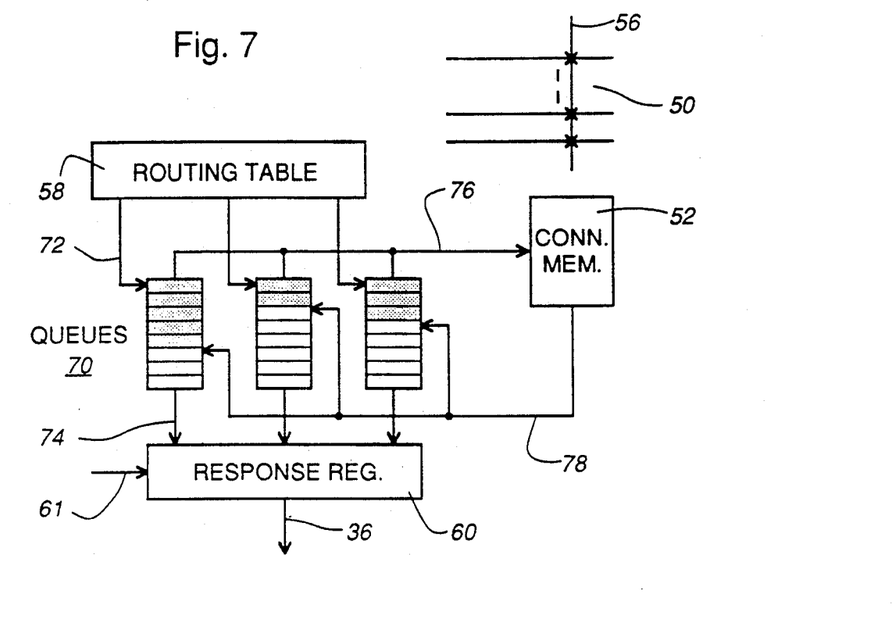

FIG. 7 illustrates a further modification in which different queues are provided for different types of traffic on the same output line 56. For simplicity, FIG. 7 shows only the queues 70 and associated parts of the control part 28 for one line 56, and other parts of the STM switch 20 are provided as in FIGS. 5 and 6.

In the modified switch arrangement of FIG. 7, different time slot channels on the line 56 may be allocated to different types of traffic or services, for example leased circuit connections, network administration, and central office trunks. A respective queue 70, three of which are illustrated in FIG. 7, is maintained for each different service type, channels being allocated from the top of each queue for the respective service type under the control of the routing table 58, and being returned to the bottom of the respective queue on becoming free, individually in the same manner as described above. To facilitate the allocation and queuing of channels, the connection memory and/or queues may store in respect of each channel an additional code identifying the service type to which the channel is allocated. Such an arrangement also facilitates providing different priorities for different types of traffic, in that higher priority connection requests may be able to be fulfilled from more than one queue.

The arrangement of FIG. 7 also facilitates providing a "busy out" condition for individual channels and/or lines 56. For example, if a subsequent node is inoperative, then all of the channels on the line 56 leading to that node can be marked as busied out so that they are never free. To this end, for example the three service types or queues 70 in FIG. 7 can each be identified by a respective 2-bit code which is used to address the queues 70. The fourth possible code combination of such a 2-bit code can represent a busy-out state, which is allocated to any channel which is not to be used, so that it is not loaded into any of the queues 70.

Figure 8:
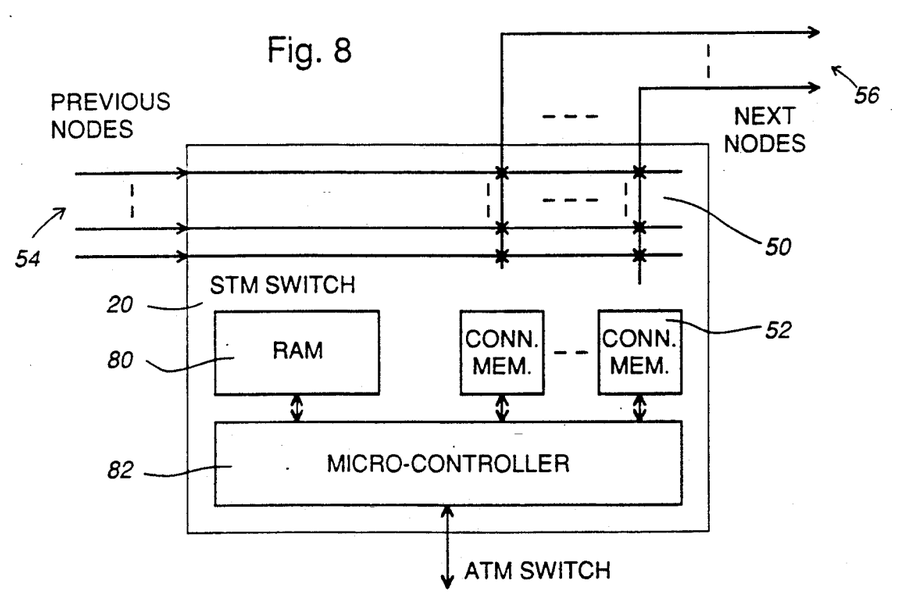
FIG. 8 illustrates parts of a preferred form of the switching node.

FIG. 8 illustrates a preferred form in which the control part 28 of the STM switch 20 is implemented, and which may embody arbitrary combinations of the arrangements of FIGS. 4 to 7. To this end, the control part 28 of the STM switch 20 comprises, in addition to the cyclic connection memories 52, a RAM 80 and a micro-controller 82, the latter communicating with the connection memories 52, the RAM 80, and the ATM switch 22. In such a preferred arrangement the RAM 80 serves for storing information constituting the routing table 58, the queues 70, and channel-service allocation information, and the micro-controller 82 operates in accordance with a set of programmed algorithms to perform the functions of the registers 60 and 62 and for communicating information between the RAM 80 and the connection memories 52. In addition, in such an arrangement the information in the RAM 80, and possibly also the algorithms in accordance with which the micro-controller 82 operates, can be updated by communications via the network itself from the network management system.

Although particular embodiments of the invention have been described in detail, numerous modifications, variations, and adaptations may be made thereto without departing from the scope of the invention as defined in the claims.

What is claimed is:

1. A switching node comprising:
   circuit switching means (20) for establishing circuit-switched connection paths between inputs and outputs of the switching node;
   message switching means (22) for communicating messages via the switching node; and
   control means (28) arranged to control the circuit switching means to establish the circuit-switched connection paths in dependence upon connection signalling messages communicated via the message switching means;
   wherein the control means (28) comprises:
   means (60) for receiving a connection signalling message from the message switching means;
   means (70) for maintaining at least one queue identifying free connection paths at the outputs of the switching node;
   means (62) responsive to an identification of a free connection path from said queue for supplying an outgoing connection signalling message to the message switching means in response to a received connection signalling message; and
   means (52) responsive to an identification of a free connection path from said queue for establishing a connection via the circuit switching means in response to a received connection signalling message.

2. A switching node as claimed in claim 1 wherein the control means is arranged to maintain at least one queue in common for a plurality of outputs of the switching node.

3. A switching node as claimed in claim 2 wherein the message switching means is coupled to the circuit switching means for conducting the connection signalling messages to and from the message switching means via the circuit switching means.

4. A switching node as claimed in claim 3 wherein the message switching means comprises an ATM switch.

5. A switching node as claimed in claim 2 wherein the message switching means comprises an ATM switch.

6. A switching node as claimed in claim 1 wherein the control means is arranged to maintain a plurality of queues for a single output of the switching node for different types of information on different channels at said output.

7. A switching node as claimed in claim 6 wherein the message switching means is coupled to the circuit switching means for conducting the connection signalling messages to and from the message switching means via the circuit switching means.

8. A switching node as claimed in claim 7 wherein the message switching means comprises an ATM switch.

9. A switching node as claimed in claim 6 wherein the message switching means comprises an ATM switch.

10. A switching node as claimed in claim 1 wherein the message switching means is coupled to the circuit switching means for conducting the connection signalling messages to and from the message switching means via the circuit switching means.

11. A switching node as claimed in claim 10 wherein the message switching means comprises an ATM switch.

12. A switching node as claimed in claim 1 wherein the message switching means comprises an ATM switch.

13. A switching node for establishing message-switched and circuit-switched communications in a switching network, the switching node comprising:

a circuit switch (20) for establishing switched connections between inputs and outputs of the switching node, the circuit switch including control means (28); and an ATM message switch (22) for establishing message-switch communications via the switching node, the ATM message switch being arranged for supplying to and receiving from the control means of the circuit switch signalling messages for controlling the establishment of said switched connections;

wherein the circuit switch control means (28) comprises:

means (60) for receiving a signalling message from the message switch;

means (52) responsive to a received signalling message for establishing a connection via the circuit switch;

means (70) for maintaining at least one queue identifying free connection paths at the outputs of the switching node; and means (62) responsive to an identification of a free connection path from said queue for supplying to the message switch an outgoing signalling message dependent upon the received signalling message and the establishment of a connection via the circuit switch.

14. A switching node as claimed in claim 13 wherein the ATM message switch is coupled to the circuit switch for conducting said message-switched communications via the circuit switch.

* * * * *